(12) United States Patent
Shore et al.

(10) Patent No.: US 8,018,382 B2
(45) Date of Patent: Sep. 13, 2011

(54) POSITIONING SYSTEM AND METHOD

(75) Inventors: Michael Shore, Falls Church, VA (US); Benjamin Dolgin, Alexandria, VA (US); Steven Cotten, Dumfries, VA (US)

(73) Assignee: Raytheon UTD Inc., Springfield, VA (US)

( * ) Notice: Subject to any disclaimer, the term of this patent is extended or adjusted under 35 U.S.C. 154(b) by 343 days.

(21) Appl. No.: 11/640,337

(22) Filed: Dec. 18, 2006

(65) Prior Publication Data

US 2008/0036652 A1 Feb. 14, 2008

Related U.S. Application Data

(60) Provisional application No. 60/750,787, filed on Dec. 16, 2005.

(51) Int. Cl.
*G01S 1/08* (2006.01)
(52) U.S. Cl. .................................................. 342/386
(58) Field of Classification Search .......... 342/385–386, 342/464, 459, 455, 462
See application file for complete search history.

(56) References Cited

U.S. PATENT DOCUMENTS

| | | | |
|---|---|---|---|
| 3,471,777 A | 10/1969 | Rona | |
| 5,442,294 A | 8/1995 | Rorden | |
| 5,646,525 A | 7/1997 | Gilboa | |
| 6,427,122 B1 * | 7/2002 | Lin | 701/214 |
| 6,720,920 B2 * | 4/2004 | Breed et al. | 342/386 |
| 6,789,043 B1 * | 9/2004 | Nelson et al. | 702/152 |
| 7,425,829 B2 * | 9/2008 | Zeller et al. | 324/326 |
| 2003/0080901 A1 * | 5/2003 | Piotrowski | 342/386 |
| 2003/0130792 A1 | 7/2003 | Mori | |
| 2003/0169335 A1 * | 9/2003 | Monroe | 348/143 |
| 2003/0220092 A1 | 11/2003 | Hethuin et al. | |
| 2004/0102219 A1 | 5/2004 | Bunton et al. | |
| 2004/0198381 A1 | 10/2004 | Siegel et al. | |
| 2005/0020278 A1 | 1/2005 | Krumm et al. | |
| 2005/0113112 A1 | 5/2005 | Bolin et al. | |
| 2005/0134453 A1 | 6/2005 | Yamada | |
| 2008/0036652 A1 | 2/2008 | Shore et al. | |

OTHER PUBLICATIONS

International Search Report and Written Opinion of International Searching Authority.

* cited by examiner

*Primary Examiner* — Thomas H Tarcza
*Assistant Examiner* — Nga X Nguyen
(74) *Attorney, Agent, or Firm* — Dickstein Shapiro LLP

(57) ABSTRACT

A positioning system designed to provide a three dimensional location of an object. The system can include one or more multiple transmitters or electromagnetic beacons, software defined radio receivers with an associated processing unit and data acquisition system, and magnetic antennas. The system applies theoretical calculations, scale model testing, signal processing, and sensor data to operate.

49 Claims, 9 Drawing Sheets

POSITIONING SYSTEM AND METHOD

This application claims the benefit of U.S. Provisional Application Ser. No. 60/750,787, filed on Dec. 16, 2005, the entire disclosure of which is incorporated herein by reference.

FIELD OF THE INVENTION

The present invention relates generally to a method and apparatus pertaining to a position system. In particular, the invention relates to determining a three dimensional location of an object.

BACKGROUND

Geological mapping and geophysical surveying on the earth's surface are mature sciences with a history of technology enhancements that improved the fidelity of understanding of the Earth, above and beneath the surface. Yet when conventional techniques are employed in an underground environment, geo-location has proven a challenge that drives concepts of operations to bootstrap techniques to geo-locate instrumentation and geological contacts and can actually limit the effectiveness of employed technologies.

Conventional mapping and survey systems, such as a Global Positioning System (GPS), determine the location of objects using satellite signals. However, a longstanding problem exists with determining location of personnel and equipment within, for example, underground facilities without the use of surveying. To date, this problem has not been resolved because of the difficulty of signaling/communicating between the Earth's surface and underground facilities/caverns/mines and the complexity of electromagnetic propagation within the Earth.

Lower fidelity very low frequency systems are currently in development in Europe to support communications for cave rescue operations. The systems only obtain a shallow depth position when the communication system is used underground. These communications systems are effective up to 600 m and occasionally to 1,200 m. The systems are also used to locate underground transmitters at comparable depths. In controlled experiments, they have achieved an accuracy of 2% in horizontal position and only 5% in depth.

SUMMARY OF THE INVENTION

The positioning system is the first practical means that will bring location determination in the underground as well as provide a low data rate back channel communication capability. This development is made possible through the assembly of sensor technologies and processing capabilities that are currently evolving at the state-of-the-art in several diverse arenas. Moreover, because of the sensor technology used in locating a position, the positioning system is not limited to use underground.

Development of the positioning system can provide individuals and equipment moving within a space, either above or below ground, the capability to know their location in three dimensions. The positioning system finds the location of an object by applying theoretical calculations, scale model testing, and technology demonstrations including state-of-the-art signal processing, fusion of multiple sensor data, and unique concepts of operation.

The invention provides a framework to demonstrate the feasibility of using multiple sensors and phenomenologies using magnetic beacons and special Software Defined Radio receivers to determine the location of an object, above or below ground. A back channel communications capability is provided, both to support the positioning system operation as well as to provide low data rate communications between multiple locations underground and with surface assets. The existence of this back channel communication enables the sharing of knowledge of the underground space configuration among multiple underground users and remote command elements as the underground is explored.

A premise of an exemplary embodiment of the positioning system is to use multiple transmitters on the surface, in the vicinity of an underground space, to provide magnetic beacons. The signal processing can be supplemented with distant signals of opportunity, both cooperative such as the High frequency Active Auroral Research Program (HAARP) and uncooperative such as very low frequency and low frequency navigation/communications systems and AM radio signals. The software defined radio receiver carried underground can accurately measure the angles between the various transmitters (vectors pointing back along magnetic field lines to the surface beacons). Given that the surface transmitter locations can be accurately determined when deployed and the magnetic radiation field can be calculated, the underground receiver location can be determined. This software defined radio receiver and associated processing unit are compatible with existing land navigation systems to provide a handheld capability that functions both above and below ground level.

An existing inertial guidance unit can be included as a part of the processing unit to provide a stable reference as a stopgap navigation capability for unique situations in which adequate signal strength from the beacons is unavailable or if the beacon signal or sensor readings are excessively distorted by underground infrastructure. In addition to the software defined radio receiver and inertial guidance unit, the invention can employ accelerometers/tilt measurement devices, magnetic compass, microbarograph, ranging on the back channel communications system, and automated pacing/velocity devices.

The positioning system provides navigation and survey both above and below ground and can be used in varying geologies. In addition to the underground application, the positioning system has applicability to the robust surface navigation problem.

DETAILED DESCRIPTION

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that structural, logical, and other changes may be made without departing from the spirit and scope of the present invention. The progression of processing steps described is exemplary of embodiments of the invention; however, the sequence of steps is not limited to that set forth herein and may be changed as known in the art, with the exception of steps necessarily occurring in a certain order.

Figure 1:
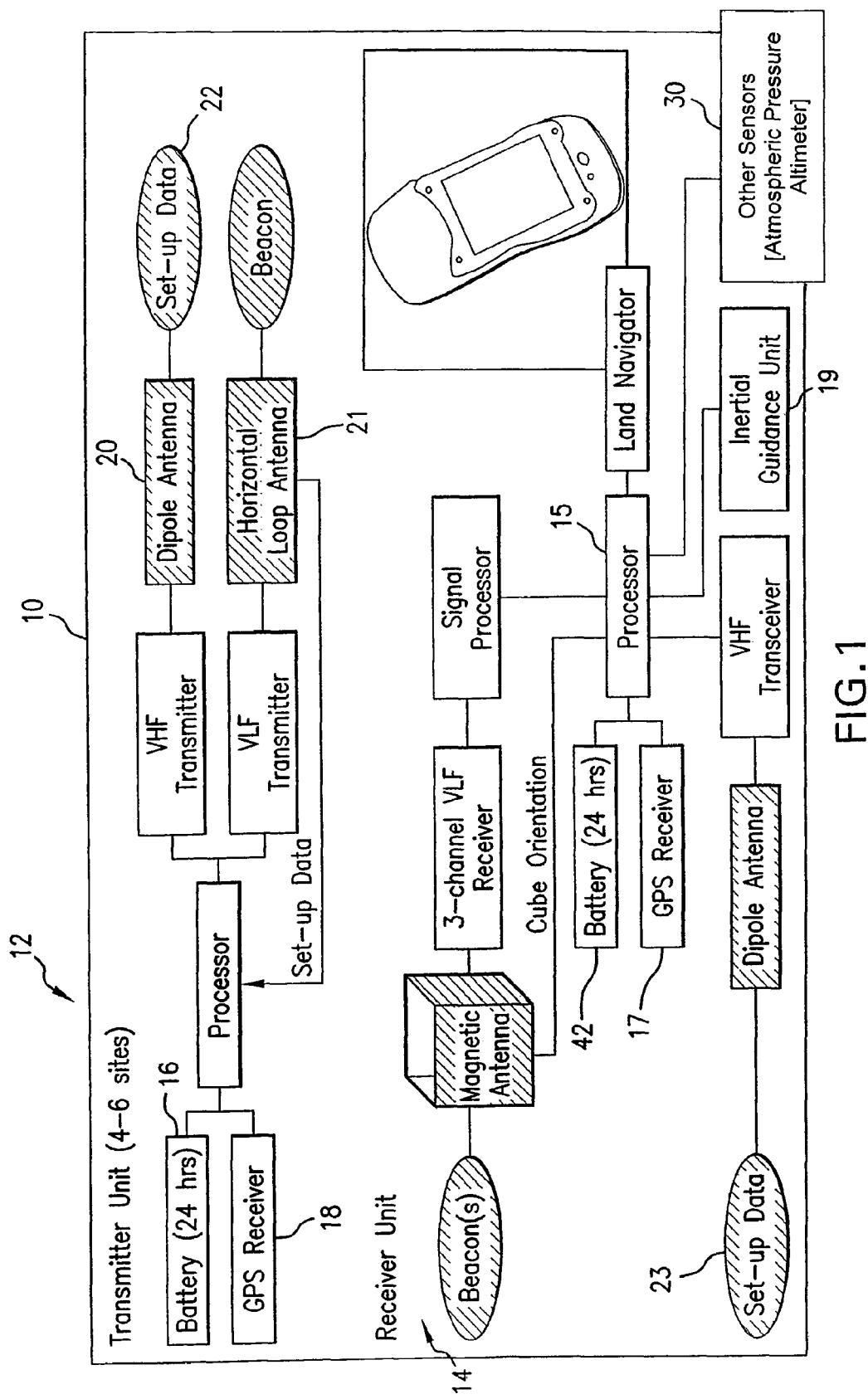
FIG. 1 shows a positioning system architecture according to the invention.
Figure 2:
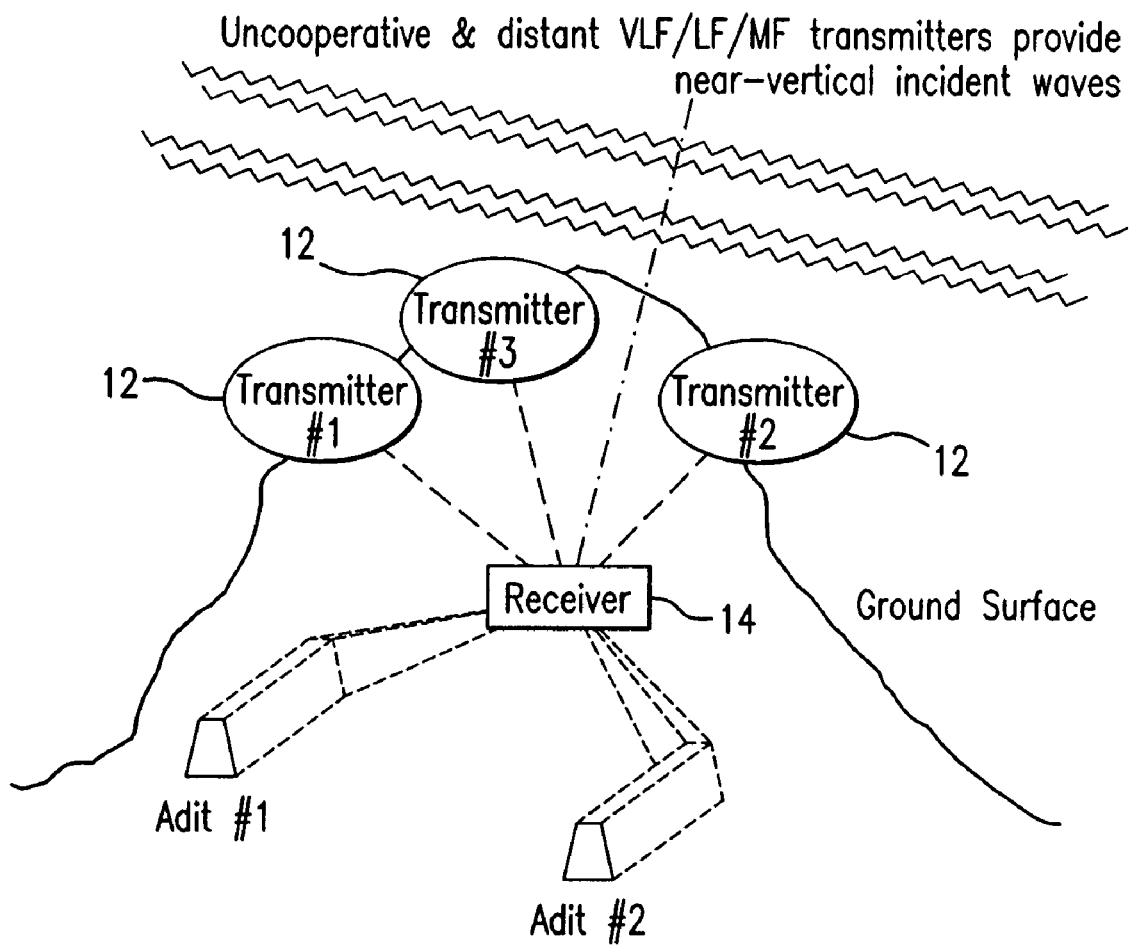
FIG. 2 shows a positioning system according to one embodiment of the invention.

An exemplary positioning system 10 is shown in FIG. 1. The positioning system has transmitter sites 12 and a receiver unit 14. As shown in FIG. 1, the positioning system 10 entails the design and integration of a number of components. The first components are surface magnetic beacons 12 that provide a continuous signal on different frequencies in the very low/low frequency range. Three to four (3-4) of these transmitters (beacons) 12 are usually required to support the positioning system 10 in the system's various applications, such as in its use in underground space. Additional signals of opportunity from other transmitters in the very low/low/medium frequency range and AM radio signals may be exploited as additional signal sources. The second component is a sensitive, three-component magnetic receiver 14 (radio) capable of accurately locating the magnetic vector emanating from the surface beacons 12. This software defined radio receiver 14 incorporates a computational unit 15 capable of processing the data from all transmitters, secondary sensors such as a magnetic compass, accelerometers, and tiltmeters to determine antenna orientation, thus providing a three-dimensional location for the software defined radio receiver 14 in the underground space, either above or below ground. As shown in FIG. 2, an embodiment according to the invention shows the software defined radio 14 below ground. This processing unit within the receiver 14 is designed so that existing land navigation options for display and user interface are preserved. Underground locations obtained from the positioning system solution will smoothly transition from GPS locations determined while the system remains above the Earth's surface.

Each transmitter beacon 12 can include a power supply, typically a battery pack 16 capable of sustaining the system for up to 30 or more hours, extendable with additional batteries. The transmitter provides an adjustable frequency source and contains a GPS receiver 18 to determine location of the transmitter package on the ground surface. The transmitting antenna may be a simple coil of wire or a more complex system employing a ferrite core. The positioning system employs beacon transmitters 12 packaged for hand emplacement while maintaining a form and fit configuration consistent with beacons 12 being packaged for airdrop or mounted on vehicles.

As shown in FIG. 1, the software defined radio receiver 14 consists of a three component RF magnetometer and a processing unit 15 capable of determining the azimuth and inclination of the vector magnetic fields induced by the beacons. Using the known locations of the cooperative transmitters 12 and azimuths to distant transmitters 12, the processing unit 15 determines the receiver 17 location on a continuous basis as the software defined radio receiver 14 is moved within the underground space. This processing unit 15 interfaces to an existing GPS-based land navigation unit to provide full integration with surface geographic information systems and databases.

In order to determine the transmitter 12 strength, we assume a 1 A-m² source and compute the fields at the received location as a function of frequency ($2\pi\omega$), depth (R) and soil conductivity ($\sigma$). For a vertical magnetic dipole at the earth's surface, the fields are described completely for the quasi-static case where the distance from the transmitter to the source is much less than a wavelength in the conducting medium (Earth). In this medium, the propagation constant is given by Eq. 1:

$$\gamma^2 = -\omega^2\mu\epsilon + j\omega\mu\sigma \tag{Eq. 1}$$

where $\mu$ and $\epsilon$ are the permeability and permittivity of the medium. By definition, the wavelength in the conducting media is simply $$1/|\gamma| \tag{Eq. 2}$$

For conditions of:

$10^{-1} < \sigma < 10^{-4}$ mhos $100 < R < 1000$ meters $100 < f < 10^6$ hertz the principal component of the magnetic field at the walls of the tunnel at the receiver location is the vertical magnetic field, given by the expression:

$$H_z = \frac{3me^{\gamma z}}{\pi\gamma h^4} \tag{Eq. 3}$$

where m is the magnetic dipole moment in Amp-m². Making some basic assumptions for typical operating conditions:

$\sigma = 10^{-3}$ mhos $f = 10,000$ hz $R = 100$ and 300 meters produces the following values for field strength at the receiver:

$R = 100$ m, $H_z = 1.5 \times 10^5$ fTesla $R = 300$ m, $H_z = 1.9 \times 10^1$ fTesla The above values assume a 1 A-m² transmitter dipole moment.

The sensitivity of the 6-inch ELF cube baseline antenna for the receiver is quoted as 6 fTesla at 10 kHz. Assuming this sensitivity is tangential (SNR=6 dB), the invention uses 20 dB SNR, and band limit noise to 1 Hz to give satisfactory dynamic system response. Computing the required transmitter 12 strength shows that the dipole moments used are $1.6 \times 10^{-3}$ A-m² at 100 m depth, and 0.8 A-m² at 300 m depth. These are relatively easily generated signal strengths in the 5 to 10 kHz range. For example, the battery operated Zonge NT-20 TEM transmitter driving a 1 m² loop can readily generate a 25 A-m² dipole moment. Much larger moments can be generated by this transmitter using a larger antenna.

Figure 3:
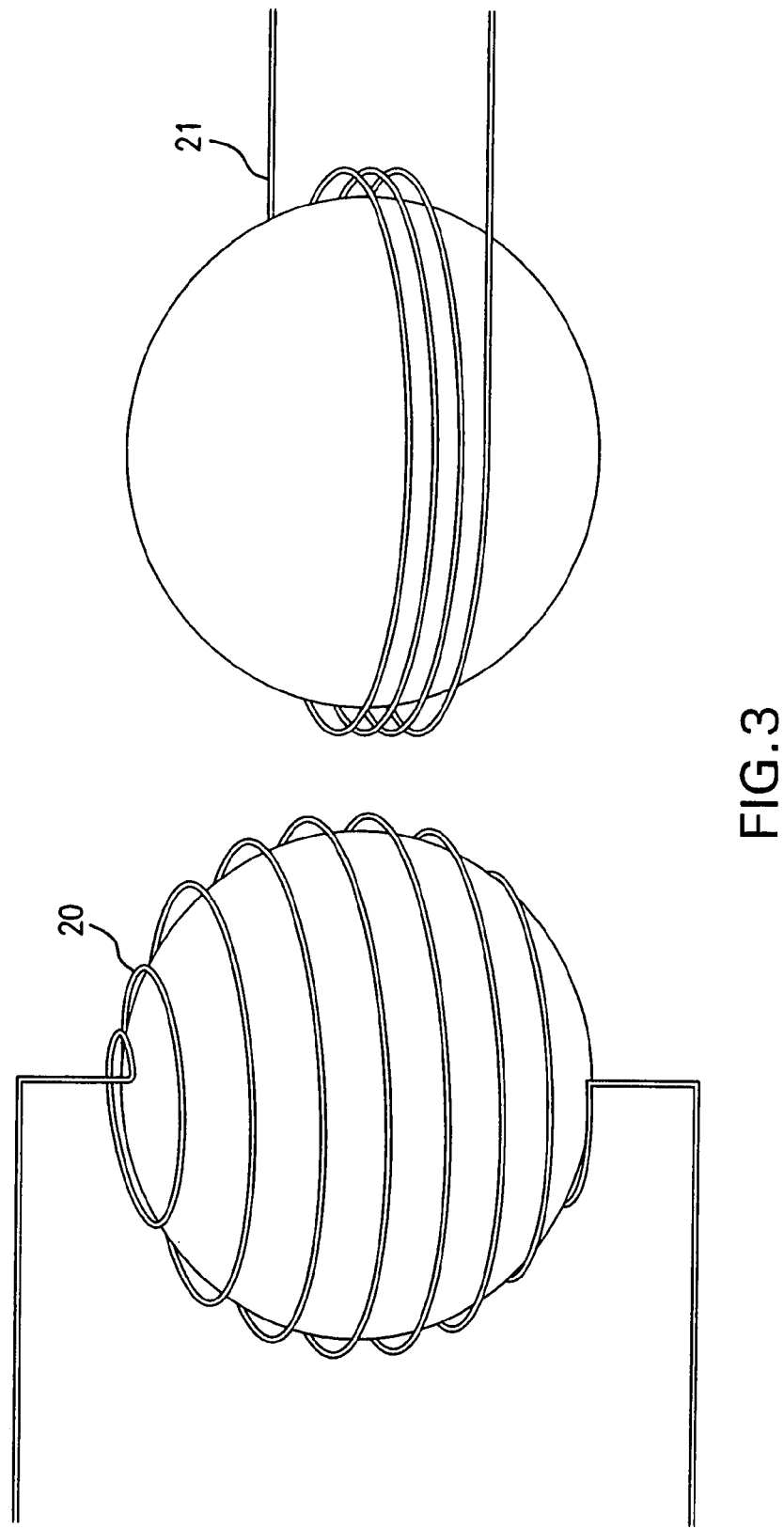
FIG. 3 shows an antenna according to an embodiment of the invention.

FIG. 3 illustrates a dipole antenna 20 and a horizontal loop antenna 21. As shown in FIG. 3, a compact antenna 20, 21 is preferred. A typical design would have the following characteristics: air core, 100 turns of #4 aluminum wire, two layers thick, 0.1 m radius and 0.26 m high. This antenna would weigh about 3.7 kg and have input impedance at 10 kHz of $1+j48\:\Omega$. To create a 1 A-m² dipole moment, it could be driven at 0.3 amps at 15 volts or 5 Watts input power. A power efficient amplifier, Class D, could be used to produce the drive signal with acceptable levels of harmonic distortion and at efficiencies of 90%. Thus, for about 6 Watts of battery power, the transmitter could provide a constant CW transmitter signal. For a design using 10 D cell $LiSO_2$ primary battery delivering 175 Watt-hours at 15 volts, the transmitter 12 could run for in excess of 30 hours.

Each transmitter 12 can carry a GPS receiver 18 to locate itself to +/−1 m. The coordinates will be transmitted as setup data 22 to the software defined radio unit 14 prior to it entering the space, whether above or below ground.

The antenna 20, 21 parameters will utilize optimization to minimize power consumption and produce the largest transmitted dipole moment. The design of the amplifier electronics can be straightforward. The system elements including time/phase synchronization associated with the rest of the system can be integrated into the transmitter design. For the final system, the packaging and complete integration of the components can use additional design engineering.

Figure 4:
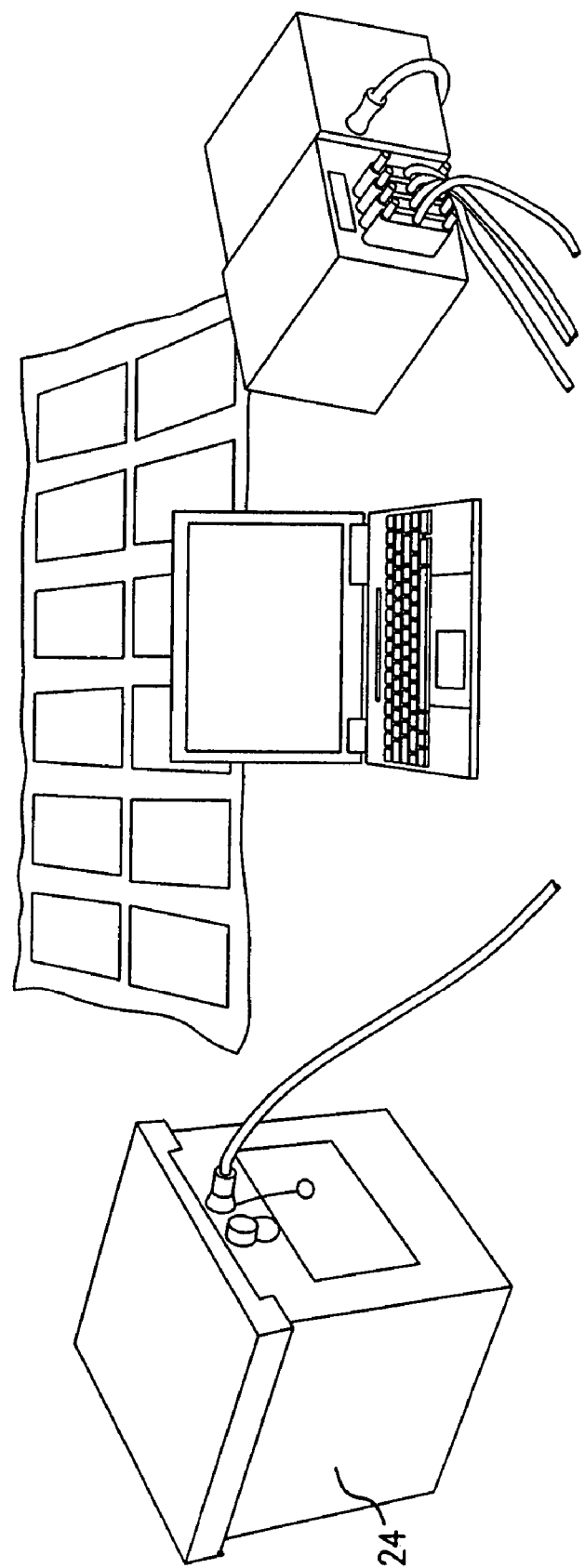
FIG. 4 shows a cube sensor used in accordance with an embodiment of the invention.

A preferred antenna for use with this invention is the Raytheon Cube sensor 24, as shown in FIG. 4, a triaxial air coil magnetic receiver that is currently one of the most sensitive instruments available with a noise floor at 10 kHz of 0.6 ftesla/sqrt Hz for the 12-inch antenna and 5 ftesla/sqrt Hz for the 6-inch antenna. By comparison, Schlumberger's EMI Technology Center manufacturers a widely used triaxial magnetometer for geophysical applications that is approximately 20 db noisier than the 6-inch cube sensor.

Figure 5:
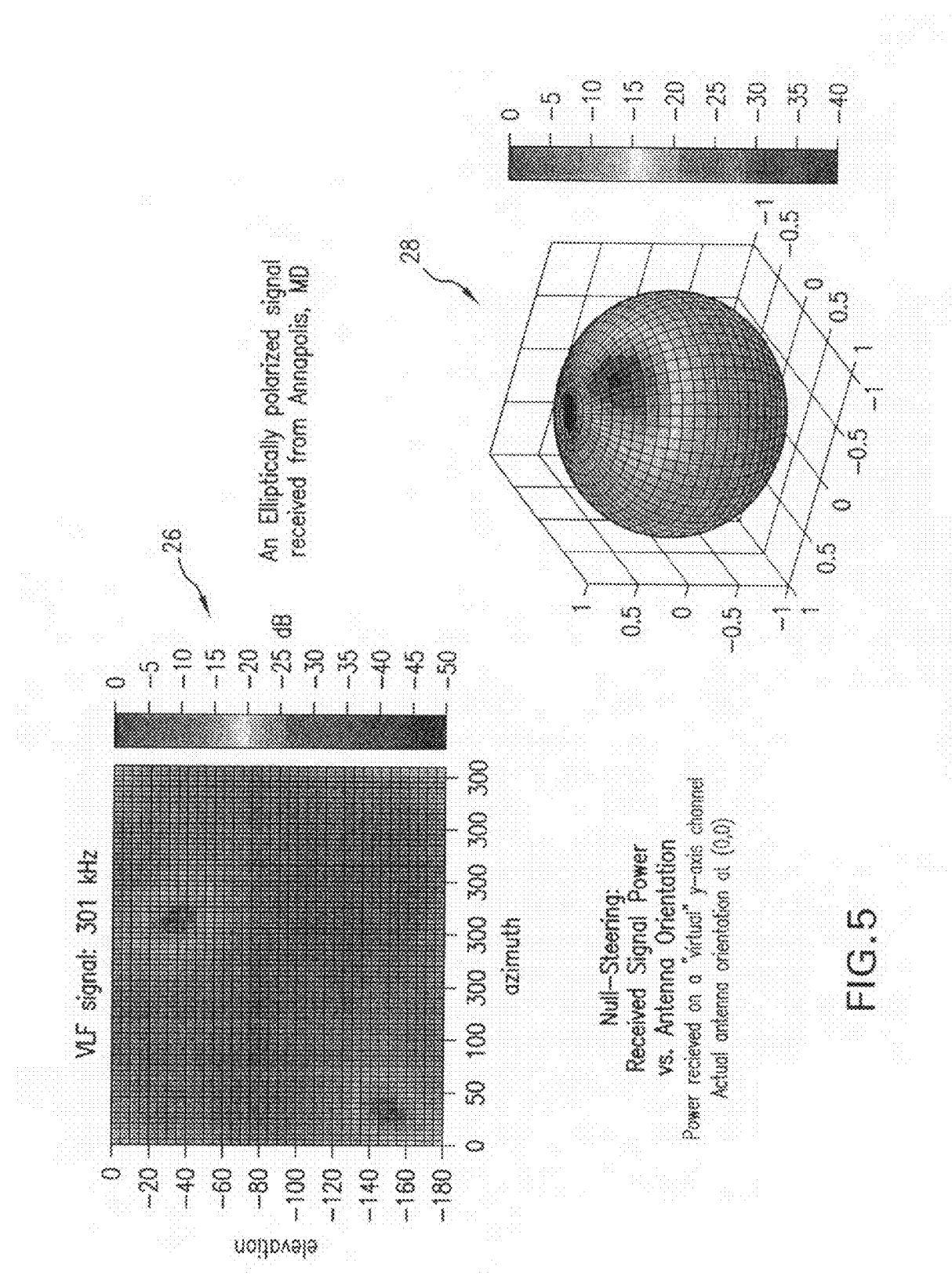
FIG. 5 shows a cube very low/high frequency 3-D direction finding capability used in accordance with an embodiment of the invention.

Once the signals from the three orthogonal antennas are received by the software defined radio 14, they can be processed to determine the vector azimuth of the primary magnetic field from each transmitter as received. FIG. 5 is an example of the energy distribution 26 for an elliptically polarized signal received by the Raytheon Cube 24.

When implemented in the positioning system 10, each channel corresponding to the transmitting antennas 12 on the surface can be processed in this manner to determine the solid angles between the vector fields of each transmitter 12. These vector fields can be corrected for the curvature of the magnetic field lines such that the location of the unit can be determined. In addition to the signals from the surface transmitters 12, other signals of opportunity such as navigation beacons, very low frequency communications systems, and High frequency Active Auroral Research Program (HAARP) can be used to provide additional constraints on the location.

A key to the location accuracy of the system 10 in one embodiment is the ability to understand and compensate for propagation anomalies in the medium between the surface transmitters and the underground receiver. Signals of opportunity can be used to characterize the medium. Distant sources of signals of opportunity can produce essentially uniform fields at the surface of the region around the operational area. These uniform fields can provide an excellent source of signals that can be measured at the receiver. By accurately measuring these signals, the effects of inhomogeneities in overburden can be estimated. These effects can then be used to adjust measured direction of arrival of signals from the surface transmitter beacons 12 to more accurately predict receiver 14 location.

FIG. 5 shows an elliptically polarized signal 28 and a diagram of received signal power versus antenna orientation 26. The received signals are not expected to be as "clean" as is shown in the example in FIG. 5. It is anticipated that there will be multi-path energy as well as secondary induced magnetic sources. However, this "apparent clutter" can be discriminated from the primary field due to its signal characteristics and quadrature phase shift. In order to further constrain the location, additional sensors 30 (FIG. 1) can be employed with the receiver 14 to provide independent information to either directly contribute to the location or to assist in weighting the contribution of beacon signals. Additional sensors 30 can include a magnetic compass, accelerometers/tiltmeters, a microbarograph, an atmospheric pressure altimeter, ranging between back channel communications relay cards, and a pedometer for the man pack version and an odometer for a vehicle mounted unit. The foundation for the back channel communications and supplemental sensors will exploit micro-electro mechanical sensor-based technologies.

An inertial guidance system 19 (FIG. 1) can be included in the design such that the positioning system 10 provides updated location information several times per second. This assures smooth operation at times when transmitters 12 are temporarily out of range or significant receiver 14 anomalies occur that distort magnetic fields to negatively impact the calculated location.

Figure 6:
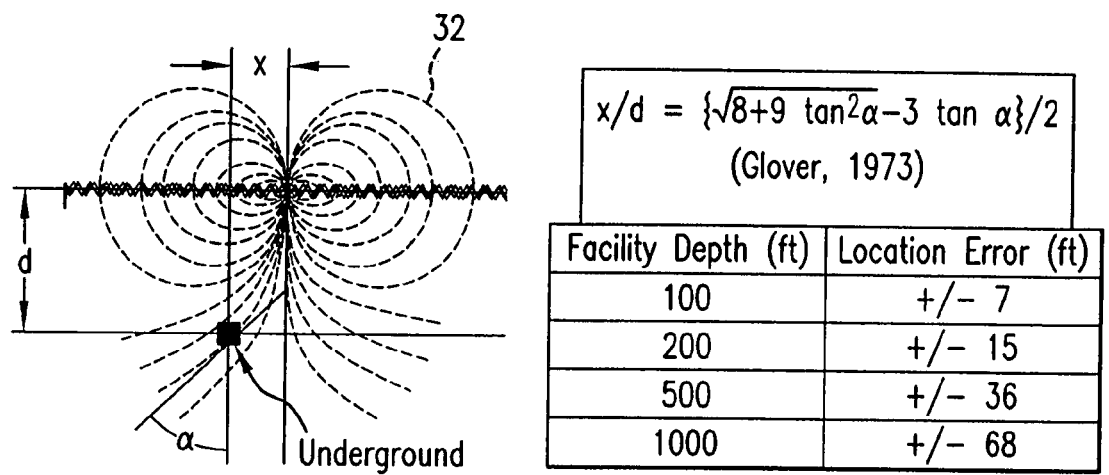
FIG. 6 illustrates an analysis of a positioning system according to an embodiment of the invention.

FIG. 6 provides an error analysis for the positioning system. This analysis assumes that there is a +/−5° error in the measurement of the vector direction. Through integrating and signal processing, this can be reduced to +/−1°. However, geological effects and the presence of anomalous secondary radiators will increase that uncertainty to approximately +/−5°. Through the use of precision frequency control and external synchronization of the beacons 12 and receiver 14 through the initial set-up data and back channel communications, it is possible to reduce this final uncertainty by an additional factor resulting in the predicted location uncertainty.

Due to the curvature of the magnetic field lines 32 relative to the horizontal plane, it is anticipated that the actual error ellipse can be oriented along the vertical axis about 30% longer than the horizontal axes. The positioning system 10 can use potential distant, but cooperative source to assist in reducing the depth uncertainty. Higher power transmitters 12 can be used to excite a swept frequency chirp or other multi-frequency signal. Due to the frequency dependence of depth of penetration of electromagnetic waves in the ground, the receiving positioning system antenna in the underground is able to detect the increased attenuation of higher frequencies within the chirped signal and thereby provide an additional constraint of the depth of the receiver.

Figure 7:
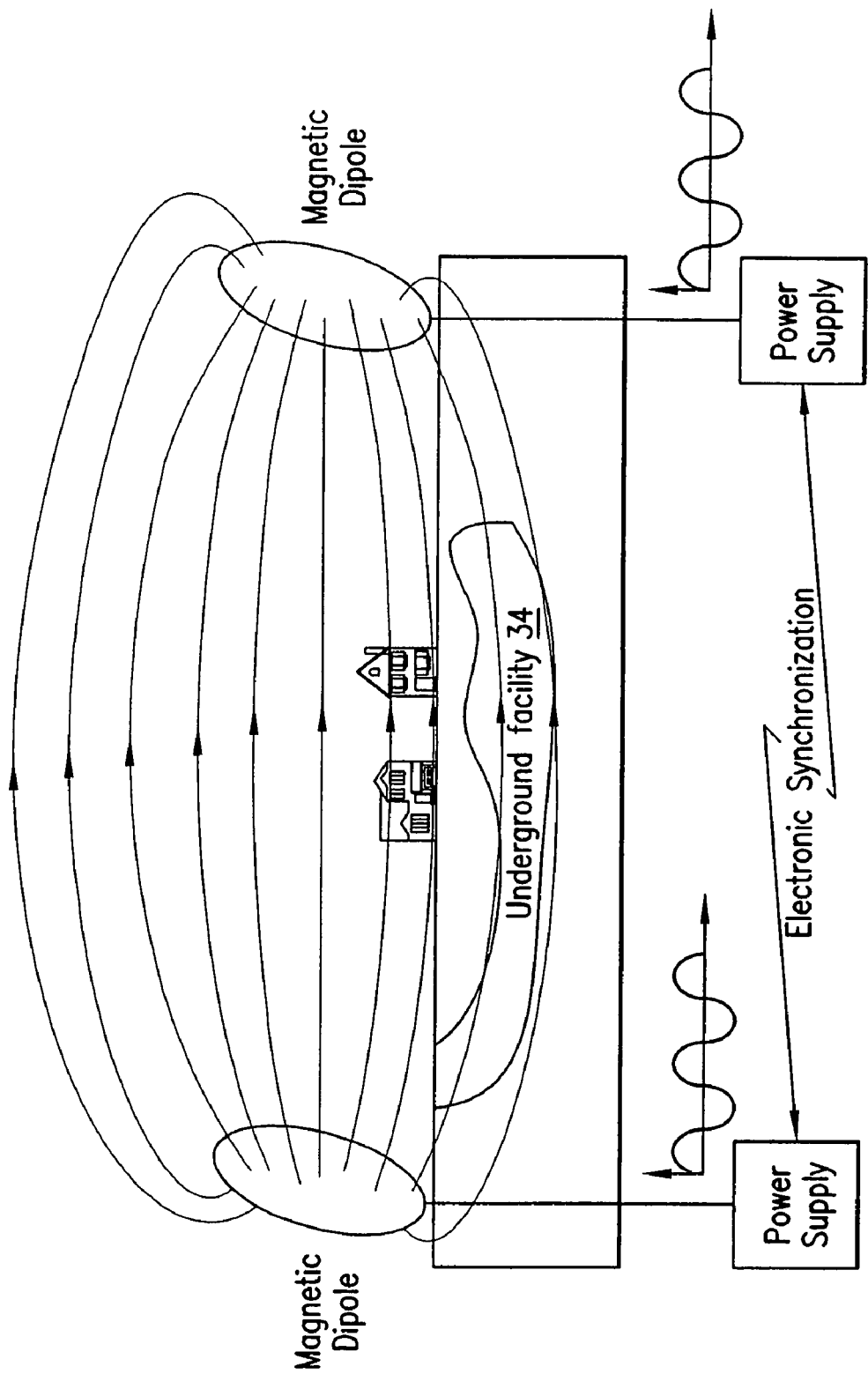
FIG. 7 shows a positioning system according to an embodiment of the invention.

In one embodiment of the invention, such as in FIG. 7, the underground very low frequency receiver is based upon the Raytheon cube antenna 24 described above. Notionally, the vector output of this antenna 24 can be measured continuously as the user moves through the underground complex 34. Associated with the antenna can be processing electronics that can compute the direction of arrival of the received magnetic fields. Stored in the processor can be the reference locations of each of the transmitters 12 as well as the surveyed information about the signals of opportunity. These can be used to estimate the current position of the user. GPS locations of the entry points will provide the "truth" for the starting positions. The outputs from the microbarometer can also be used to help provide incremental update and error correction for elevation estimates. Using this data, the computed location can be continually updated on the GPS display.

A goal of an embodiment of the invention is to reduce motion induced noise below the noise floor of the system 10 for typical user motions. The frequency of operation helps this problem, as the components of user noise induced at the operational frequency will be small. The design approach can take this into consideration to ensure that motion components in the very low frequency range of interest (~10 kHz) are minimal. For example, the antenna can be encased in foam damping materials that substantially attenuate motion components in this range. This can be done with relatively small volumes of damping foam material. The invention can provide sufficient dynamic range on the antenna outputs such that out of band motion induced noise (primarily in the extremely low frequency range) do not overload the electronics. The baseline design also includes tilt sensors on the antenna to measure antenna motion. Micro-electro mechanical sensor-based, solid state tilt sensors can be used for this purpose. With suitable motion information, adaptive filtering can be used to further reduce the effects of motion on the antenna. Complete Faraday shielding of the antenna can be helpful to reduce potential interference from outside interferers.

Figure 8:
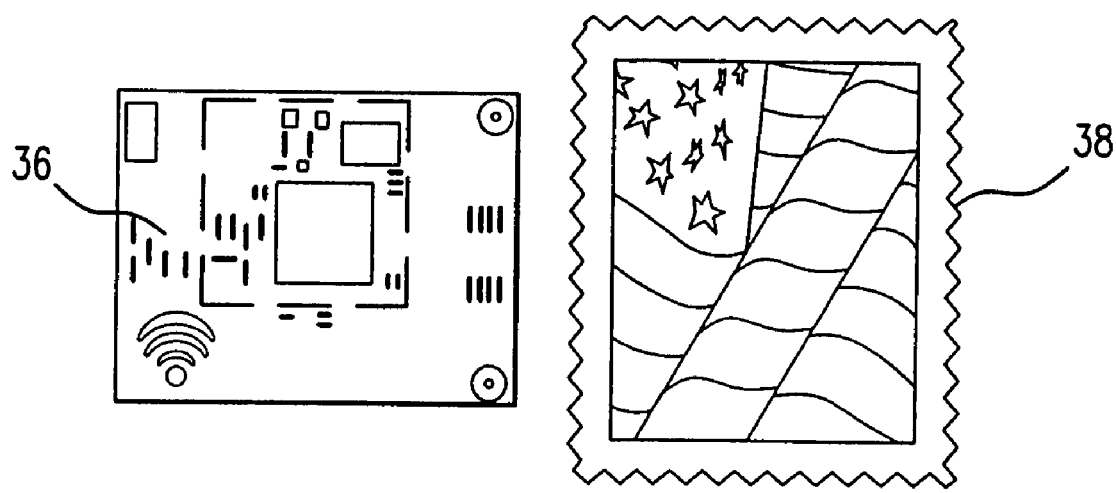
FIG. 8 shows a transceiver used in accordance with an embodiment of the invention.

The receiver can feature an integrated back channel communications path that can enable the user to have elementary communications outside the underground location linked to traditional communications systems located near the point of entry. As shown in FIG. 8, one embodiment of the invention uses miniature, disposable, easily concealed ad hoc, mesh networked transceivers 36 for this purpose.

The networking protocol allows for automatic network join, relay and update features. The current baseline 2.4 GHz radio 36 measures less than 21×27×6 mm including antenna, or about the area of a postage stamp 38, illustrated in FIG. 8. Notionally, the user can drop or place these small radios 36 as a "bread crumb" trail as he moves along the tunnel or facility. When placed at corners or choke points, the radios 36 will be able to communicate several hundred meters before another one must be emplaced. The very low frequency receiver will have one of these small communications transceivers embedded in the electronics that communicates with the "bread crumb" trail. At the other end of the trail, a conventional communications transceiver can then connect to the communications channels for the rest of the network supporting the operation. The small transceivers as currently designed are developed to send and receive data only. The very low frequency receiver has methods for the operator to easily and rapidly enter encoded commands that can be relayed to and from the communications network. A small, hand held or wearable personal digital assistant can be used for this purpose. It is also possible to send and receive either intermittent or continuous voice over this same network. Users are able to not only determine their own position, but to also send their position to the rest of the operations team. Similarly, they are also able to receive via the same network the locations of other users in the team as they report their positions.

In traditional geophysical surveying using electromagnetic approaches, the presence of conductors near the source and receiver can be minimized through careful collection planning. However in the positioning system, anticipation of operational sites can have surface conductors near the locations where transmitters 12 are deployed, that these conductors in the form of pipes, tunnel lining, and boreholes will be present throughout the area operated, and that there will be conductors in the near field of the receiver 14 in the underground. All of these are problematic and represent a significant source of "clutter" or noise which may impede the proper operation of the positioning system 10. The invention addresses all of these functional elements: validation of theoretical models; development of magnetic field templates to support the location algorithms; and development of automated procedures for separating clutter from the direct transmitted signals.

For the positioning aspects of this system, this natural and man-made "clutter" is a potential hindrance to the positioning system 10 performance. In another potential application of this system, the "clutter" is actually a source of useful signal which can be analyzed to reveal significant or important information about the material composition and/or hydrology of the Earth within the volume of influence of the positioning system beacons 12. Several different means are possible to alter the behavior and performance of the positioning system 10 to conduct investigation of the geophysical properties of subsurface materials.

Multiple surface transmitters/beacons 12 in the extremely low/very low/low frequency ranges are employed as the radio frequency magnetic field beacons. Depending on the desired information and specific access availability, similar beacons are also employed within the underground space and in vertical and/or horizontal boreholes. For geophysical applications, beacons 12 can transmit either single frequency, swept frequency, or some other signal mode to simultaneously maximize location determination for receiver units 14 and provide enhanced data to support geophysical interpretations. Beacon 12 locations and orientations are passed by a radio frequency link to an underground receiver unit 14 as "set-up data" 23 before the unit goes underground. The underground receiver unit 14 consists of a three-component receiver to detect the beacons 12, other extremely low/very low/low frequency sources, and similar signals. The underground receiving unit 14 can also be employed above ground and/or in vertical or horizontal boreholes to enhance geophysical signature collections. Additional sensors are included in the receiver unit to include, but are not limited to, magnetic compass, magnetometers, microbarograph, and accelerometers. Additional geophysical sensors can be deployed simultaneously to aid in the interpretation.

An overview of the positioning system's 10 concept of operations are described in the following paragraphs. The positioning system 10 can have a short set up time, can be easily operated by field personnel, and affords the ability to deploy worldwide. The system 10 consists of rugged magnetic transmitters (beacons) 12 operating in the very low/low frequency range. The system can be deliverable by air or manual means and is unaffected by most nearby structures. A magnetic antenna is used in the underground to receive signals from the transmitters 12 on the surface. The software defined radio receiver 14 has a hand held display and can be man packed or mounted on all terrain vehicles as the situation dictates.

Figure 9:
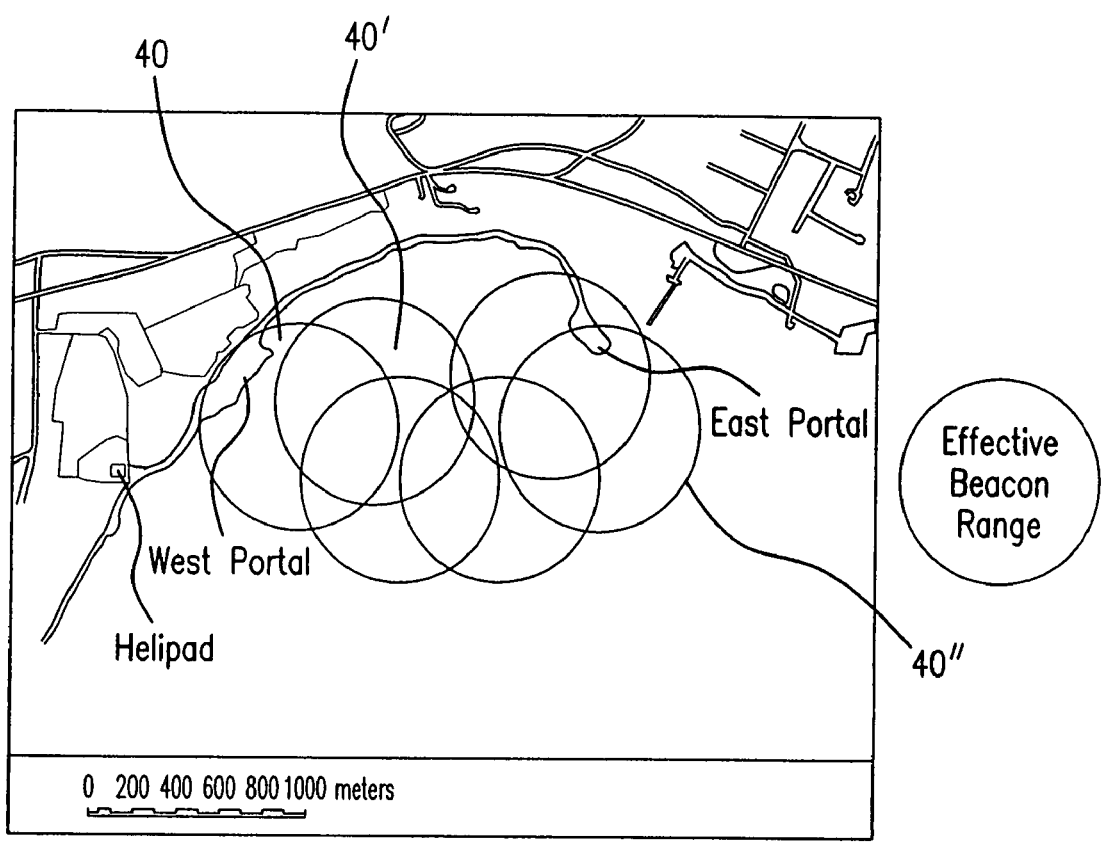
FIG. 9 shows transmitter coverage over an underground facility in accordance with an embodiment of the invention.

Deployment of electromagnetic transmitters 12 can be conducted in several ways. The transmitter 12 may be air dropped by fixed-wing aircraft, rotary aircraft or emplaced manually. An all terrain vehicle may be used to place the beacon transmitters 12 in the desired location providing the optimum overlay pattern. The transmitters 12 should be placed in such a manner that at least three of the signals 40, 40', 40" overlap each other in the effective beacon range, as shown in FIG. 9. To ensure adequate coverage of the transmitter beacon range, signal emissions 40, 40', 40" can form an umbrella over the target area.

To initiate use of the positioning system 10, field personnel can synchronize with transmitters 12 verifying connectivity by signal display on hand held receivers. Transmitter 12 locations and orientation are sent to the receiver 14 prior to entering the underground facility. The operator can ensure that the receiver 14 initializes with the transmitters 12 prior to going underground and that track logging is operational. An operations center located off site, but in proximity to the application site, could monitor the current position of the positioning system receivers 14 underground.

The positioning system receiver 14 can be mounted on an all-terrain vehicle or worn in a backpack. The receiver utilizes beacon 12 signals to geo-locate itself within the underground. A rugged hand held navigation receiver 14 can display current grid location, bearing, path tracking, critical waypoints of interest, and battery life. The receiver 14 can be an operator controllable, backlit, drill down menu based platform. The menus can be easily navigated and user friendly. Upon GPS lock, the transmitter 12 will begin emitting location and orientation signals to the receiver 14. The receiver 14 can be easily reconfigured from the man pack mode to the ATV configuration. All necessary accessories are compatible with either configuration.

The transmitters 12 and receivers 14 can have an active life cycle of up to 30 or more continuous operating hours, extendable with additional batteries. In the event field operations exceed the life cycle, the batteries can be manually replaced or new transmitters 12 can be deployed. An internal memory battery 42 (FIG. 1) can prevent data loss in the event of the primary battery failure. To conserve battery 42 power and limit operating signature, programmable time delay and wake up capability can be used when transmitters are emplaced prior to operations. Once each transmitter 12 is placed and activated, they can turn on and auto locate by using a Global Positioning System 10.

A back channel communication link using disposable relay cards, "bread crumbs," can be used to communicate with the surface transmitter/receiver and other operational elements. These "bread crumbs" can provide line of site data relay along the tunnels. The individual relay cards can form a sparse network capable of relaying data between above ground and below ground units. The receiver 14 can have the ability to send low data rate communications to the above ground receiver. This can enable the remote control center to track the location of the positioning system receivers 14 underground and communicate with each receiver operator.

Underground navigation and mapping can be conducted in multiple ways. In the back-packed configuration, a single operator can operate and carry the receiver 14 while exploring the underground environment. With the receiver 14 mounted on a vehicle, the vehicle operator can operate the positioning system 10 hands free while data is sent to the surface receiver. The hand held receiver 14 is attachable to the operator's equipment. The mobile control center can have the same graphic representation of the mapping and underground navigation as the underground operator.

Beyond geophysical exploration, other potential applications of the positioning system 10 concept include remote surveying of abandoned underground mines, natural cavern exploration and surveying, and underground mine and cavern rescue. Moreover, the invention is not limited to underground applications but can be applied in a variety of environments, including above ground locations.

According to another embodiment, a processing algorithm (15) characterizes local magnetic anomalies by comparing true geographic North-South direction as measured by a gyro compass with the magnetic North as measured by a magnetic compass. According to yet another embodiment, the processing algorithm characterizes the local magnetic anomalies by comparing true vertical direction as measured by an inclinometer and an electromagnetic vertical as measured by a direction of propagation of a plane electromagnetic wave from a cooperative source.

According to yet another embodiment, the processing algorithm characterizes the local magnetic anomalies by comparing true geographic East-West as measured by a gyro compass and the magnetic "East" created by an artificial magnetic dipole placed near a navigation site. The artificial magnetic dipole may be formed by two or more synchronized beacons 12 that are placed in a near horizontal orientation near the navigation site, and that are separated by a relatively large distance and are oriented in a direction that is not parallel to North-South.

According to yet another embodiment, the processing algorithm characterizes local magnetic anomalies by comparing directions of the magnetic fields produced by the beacons 12 and measured by the magnetic field sensor to actual coordinates of the magnetic field sensor as measured by other devices, such as a GPS, when the magnetic field sensor is above ground, or by positioning the magnetic field sensor over known landmarks or other triangulated points.

According to yet another embodiment, the beacons 12 communicate information to navigation devices, and the communicated information is unrelated to navigation. The communication system may use harmonics or sub-harmonics frequencies, to facilitate synchronous detection.

According to yet another embodiment, the beacons 12 can scan a space in a predetermined fashion to improve a navigation and/or a geological characterization of a site, and the scan may be a C-scan or conical scan.

Delivery and placement of the beacon 12 may be performed by hand, or by using parachutes or penetrometers. According to one aspect of the invention, a delivery system has a large diameter penetrometer that encloses the whole of the beacon 12 and a small diameter penetrometer that is attached to the beacon 12 and that is used as a mount.

According to another aspect of the invention, the beacons 12 are located aboard stationary or moving vehicles, helicopters, or drones.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modifications, though presently unforeseeable, of the present invention that come within the spirit and scope of the following claims should be considered part of the present invention.

What is claimed as new and desired to be protected by Letters Patent of the United States is:

1. A positioning system comprising:
   at least two electromagnetic beacons;
   a sensor that measures instantaneous values of magnetic vectors of a magnetic field produced by the beacons, said magnetic vectors having orientations;
   a processing algorithm that calculates a position of the sensor based, on the values and said orientations of the magnetic vectors;
   at least one data acquisition and computing system that implements the algorithm; and
   at least one unit that displays navigation information to an operator; and
   wherein the electromagnetic beacons are located above ground, and wherein the sensor that measures the instantaneous vector values of the magnetic field produced by the electromagnetic beacons is located below the ground, and wherein the unit that displays the navigation information to the operator is located below the ground, such that the navigation information is displayed to the operator below the ground while the operator is located below the ground and while the beacons are located above the ground.

2. The positioning system according to claim 1 wherein the positioning system measures the local Earth magnetic field vector and direction of gravity.

3. The positioning system according to claim 1 wherein the positioning system receives signals of opportunity from transmitters in the very low/low/medium frequency range.

4. The positioning system according to claim 1 wherein the algorithm comprises signals from a network of transceivers placed between a navigation system and a location where a reference to an external navigation system exists.

5. The positioning system according to claim 1 wherein the electromagnetic beacons include magnetic coils with or without a ferromagnetic core that have a well characterized spatial distribution of the magnetic field.

6. The positioning system according to claim 5 wherein the electromagnetic beacons can measure their own position and orientation in an external coordinate system and communicate that information to the data acquisition and computing system to transform the spatial magnetic field distribution into a spatial distribution with respect to an external coordinate system.

7. The positioning system according to claim 5 wherein the electromagnetic beacons can measure their position and physically change their orientation in space and thus change the orientation of their magnetic field in an external coordinate system and communicate that information to the data acquisition and computing system to transform the spatial distribution into a spatial distribution with respect to the external coordinate system.

8. The positioning system according to claim 5 wherein the electromagnetic beacons control an emitted electromagnetic field by reference to an internal clock and can synchronize internal clocks with each other and with an internal clock of the magnetic field sensor and/or the data acquisition and computing system.

9. The positioning system according to claim 8 wherein the beacons synchronize internal clocks, with respect to a signal of opportunity, before deployment in a field and maintain synchronization by maintaining clock accuracy.

10. The positioning system according to claim 1 wherein the processing algorithm improves navigational data accuracy by correcting for local magnetic anomalies.

11. The positioning system according to claim 10 wherein the processing algorithm characterizes the local magnetic anomalies by comparing true geographic North-South direction as measured by a gyro compass with the magnetic North as measured by a magnetic compass.

12. The positioning system according to claim 10 wherein the processing algorithm characterizes the local magnetic anomalies by comparing true vertical direction as measured by an inclinometer and an electromagnetic vertical as measured by a direction of propagation of a plane electromagnetic wave from a cooperative source.

13. The positioning system according to claim 10 wherein the processing algorithm characterizes the local magnetic anomalies by comparing true geographic East-West as measured by a gyro compass and magnetic "East" created by an artificial magnetic dipole placed near a navigation site.

14. The positioning system according to claim 13 wherein the artificial magnetic dipole is formed by two or more synchronized beacons that are placed in a near horizontal orientation near the navigation site, and that are separated by a relatively large distance and are oriented in a direction that is not parallel to North-South.

15. The positioning system according to claim 10 wherein the processing algorithm characterizes local magnetic anomalies by comparing directions of the magnetic fields produced by the beacons and measured by the magnetic field sensor to actual coordinates of the magnetic field sensor as measured by other devices such as a GPS when the magnetic field sensor is above ground, or by positioning the magnetic field sensor over known landmarks or other triangulated points.

16. The positioning system according to claim 10 wherein the processing algorithm determines local magnetic anomalies by measuring magnetic fields at multiple positions with known geographic coordinates above or below ground.

17. The positioning system according to claim 16 wherein the measurements are performed above ground so that the positions may be measured independently with respect to a GPS or a similar navigational system.

18. The positioning system according to claim 16 wherein characterization of magnetic anomalies is performed using one magnetic field sensor and the characterization so derived is used by other magnetic field sensors and displays.

19. The positioning system according to claim 1 wherein the beacons change their frequencies in a predetermined manner to form temporary artificial beacons.

20. The positioning system according to claim 1 wherein the beacons transmit at 2 or more frequencies such that one of these signals forms artificial dipoles while the other frequencies form a beat frequency signal.

21. The positioning system according to claim 8 wherein the data acquisition and computing system performs synchronous detection of signals from the beacons, the synchronous detection occurring where the measured signal received by the magnetic field sensor is correlated with an expected time dependent profile of the signal that is generated based on a synchronization clock, the detection being performed by maximizing in-phase signals and minimizing out-of-phase and random signals.

22. The positioning system according to claim 21 wherein a signal generated by the beacons has fractional frequency ratios.

23. The positioning system according to claim 21 wherein each of the frequencies of all the beacons changes in a predetermined pseudo-random manner.

24. The positioning system according to claim 21 wherein some of the beacons transmit at several frequencies simultaneously.

25. The positioning system according to claim 1 where beacon signals are modulated to transmit information to display units.

26. The positioning system according to claim 1 wherein the magnetic field sensor includes a coil antenna comprising at least 3 wire coils with orientations that are not parallel to a single plane.

27. The positioning system according to claim 1 wherein the magnetic field sensor includes a ferrite magnetic antenna placed in a proximity of a magnetic field sensing element, such as a coil, a fluxgate, a magnetoresistor, a Hall effect sensor, or a superconducting quantum interference device magnetometer.

28. The positioning system according to claim 27 wherein the ferrite magnetic antenna is formed by an oblong piece of high magnetic permeability material with a high length-to-diameter ratio.

29. The positioning system according to claim 5 wherein the beacons communicate information to navigation devices, and wherein the communicated information is unrelated to navigation.

30. The positioning system according to claim 29 wherein a communication system uses harmonics or sub-harmonics frequencies, and wherein the use of the frequencies facilitates synchronous detection.

31. The positioning system according to claim 10 wherein the algorithm uses magnetic anomalies to determine the geological and hydrological characteristics of media and characteristics of man-made structures surrounding the magnetic field sensor.

32. The positioning system according to claim 10 wherein the positioning system has an ability to measure electromagnetic radiation at frequencies other than those used for navigation that may be initiated by other sources.

33. The positioning system according to claim 32 wherein the positioning system combines navigation data and non-navigation electromagnetic data to determine the geological and hydrological characteristics of media and characteristics of man-made structures surrounding the magnetic field sensor.

34. The positioning system according to claim 1 wherein the beacons transmit electromagnetic radiation that is used for geological and hydrological characterization.

35. The positioning system according to claim 34 wherein an electromagnetic signal is used in multiple spectral regions for navigation and characterization of a subsurface geophysical environment.

36. The positioning system according to claim 31 wherein the electromagnetic beacons can measure their own position and orientation in an external coordinate system and communicate that information to the data acquisition and computing system to transform the spatial magnetic field distribution into a spatial distribution with respect to the external coordinate system, and wherein the algorithm uses at least one of the beacons with known locations to characterize other RF sources.

37. The positioning system according to claim 26 wherein at least one coil of the coil antenna is used to transmit information to a surface.

38. The positioning system according to claim 37 wherein the beacons are used as receivers for the signal transmitted by the coil antenna.

39. The positioning system according to claim 5 wherein a coil is wrapped around a ferromagnetic sphere and digitally controlled electronics with a synchronized clock introduce a current into the coil.

40. The positioning system according to claim 39 wherein the coil is placed either around a largest cross-section of a sphere, or uniformly around the sphere, or some intermediate partial coverage of the sphere.

41. The positioning system of claim 1, wherein the algorithm uses effects of known geological and hydrological features.

42. The positioning system according to claim 41 wherein the algorithm can optimize a location of the beacons for best navigation results.

43. The positioning system according to claim 5 wherein the beacons can be moved in a predetermined fashion.

44. The positioning system according to claim 5 wherein the positioning system can scan a space in a predetermined fashion, the scan being a C-scan or conical scan.

45. The positioning system according to claim 5 wherein a beacon is arranged to be delivered and placed by hand placement, parachute, or penetrometer, the penetrometer being a large diameter penetrometer that encloses the whole of the beacon and a small diameter penetrometer that is attached to the beacon and used as a mount.

46. The positioning system according to claim 44 wherein beacons are located aboard stationary or moving vehicles, helicopters, or drones.

47. The positioning system according to claim 1 wherein the positioning system receives AM radio signals.

48. A positioning system comprising:
at least two electromagnetic beacons;
a sensor that measures instantaneous values of magnetic vectors of a magnetic field produced by the beacons, said magnetic vectors having orientations;
a processing algorithm that calculates a position of the sensor based on the values and said orientations of the magnetic vectors;
at least one data acquisition and computing system that implements the algorithm; and
at least one unit that displays navigation information to an operator; and
wherein the positioning system receives signals, representative of elevation of the sensor, from an atmospheric pressure altimeter.

49. The positioning system according to claim 48 wherein the positioning system receives signals from an inertial navigation system and odometers that measure a total distance traveled.

* * * * *